US012585663B1

(12) United States Patent
Margolin

(10) Patent No.: US 12,585,663 B1
(45) Date of Patent: Mar. 24, 2026

(54) COMBINING COMPUTER IMPLEMENTED GENERALIZED INTELLIGENT DOCUMENT PROCESSING WITH PERSONALIZED PATHWAY SELECTION

(71) Applicant: Intuit Inc., Mountain View, CA (US)

(72) Inventor: Itay Margolin, Petah Tikva (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/373,478

(22) Filed: Oct. 29, 2025

(51) Int. Cl.
*G06F 16/2457* (2019.01)
*G06F 16/906* (2019.01)
*G06F 16/93* (2019.01)
*G06F 40/279* (2020.01)
*G06F 40/40* (2020.01)

(52) U.S. Cl.
CPC ...... *G06F 16/24578* (2019.01); *G06F 16/906* (2019.01); *G06F 16/93* (2019.01); *G06F 40/279* (2020.01); *G06F 40/40* (2020.01)

(58) Field of Classification Search
None
See application file for complete search history.

(56) References Cited

U.S. PATENT DOCUMENTS

| | | | |
|---|---|---|---|
| 2021/0117759 A1* | 4/2021 | David | G06N 3/048 |
| 2025/0148020 A1* | 5/2025 | Padmashali | G06F 16/93 |
| 2025/0342313 A1* | 11/2025 | Tsivkin | G06F 40/205 |
| 2025/0371248 A1* | 12/2025 | Chapagain | G06F 40/106 |

* cited by examiner

*Primary Examiner* — Eddy Cheung
(74) *Attorney, Agent, or Firm* — Lathrop GPM LLP

(57) ABSTRACT

A method includes classifying an uploaded document from a user application by a large language model (LLM) to obtain a ranked list of document types of the uploaded document. A multitude of pathways corresponding to the ranked list of document types is retrieved. A first portion of each of the multitude of pathways is executed in parallel to obtain a multitude of evidence structures. The evidence structures are processed using a personalized ranking model of a user of the user application, to obtain a ranked list of pathways. The ranked list of pathways is presented in the user application. A selected pathway is received from the user application. A second portion of the selected pathway is executed to process the uploaded document.

20 Claims, 6 Drawing Sheets

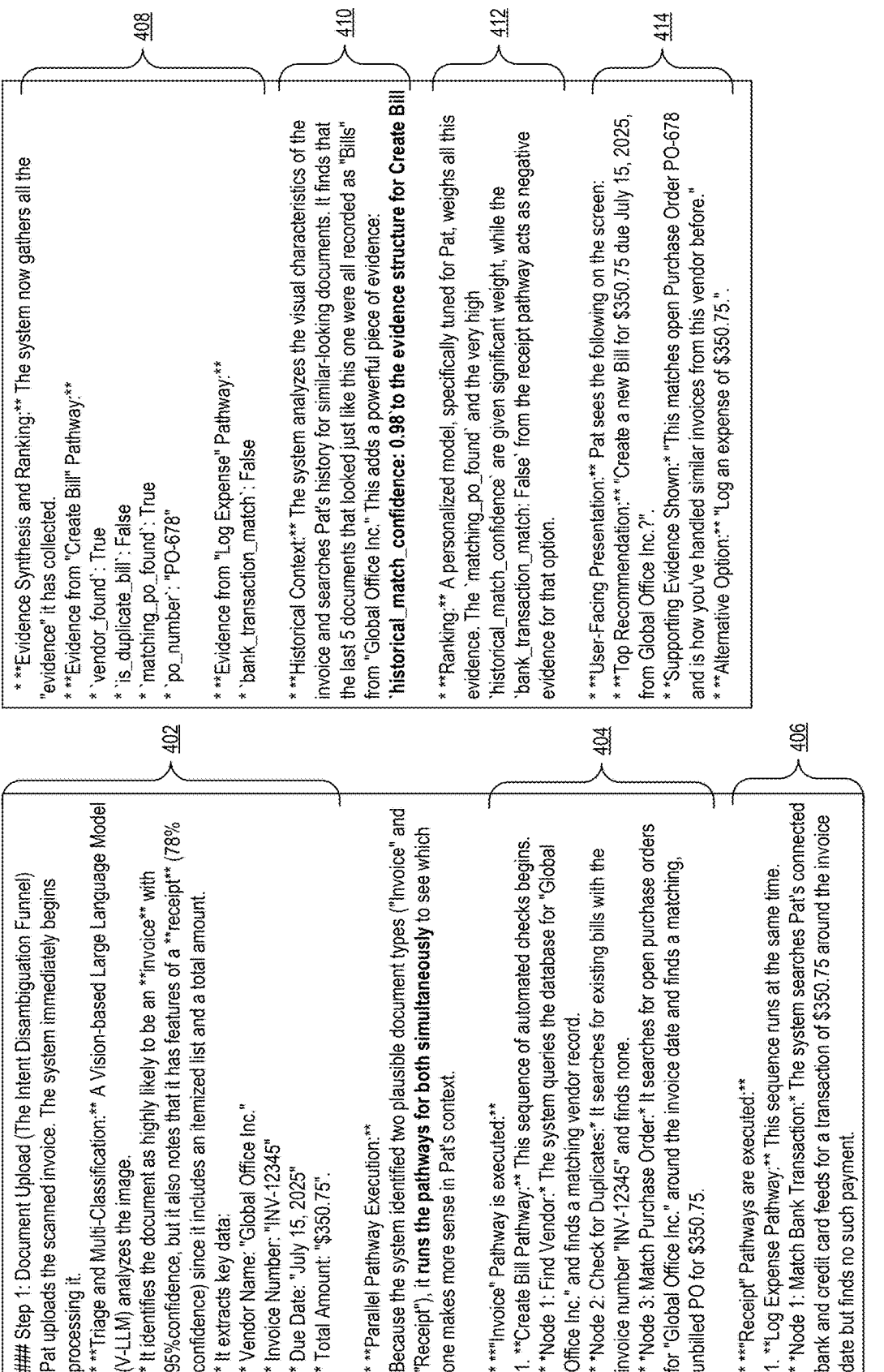

Step 1: Document Upload (The Intent Disambiguation Funnel)
Pat uploads the scanned invoice. The system immediately begins processing it.
* Triage and Multi-Classification: A Vision-based Large Language Model (V-LLM) analyzes the image.
* It identifies the document as highly likely to be an invoice with 95% confidence, but it also notes that it has features of a receipt (78% confidence) since it includes an itemized list and a total amount.
* It extracts key data:
* Vendor Name: "Global Office Inc."
* Invoice Number: "INV-12345"
* Due Date: "July 15, 2025"
* Total Amount: "$350.75".

* Parallel Pathway Execution:
Because the system identified two plausible document types ("Invoice" and "Receipt"), it runs the pathways for both simultaneously to see which one makes more sense in Pat's context.

402

* "Invoice" Pathway is executed:
1. Create Bill Pathway: This sequence of automated checks begins.
* Node 1: Find Vendor: The system queries the database for "Global Office Inc." and finds a matching vendor record.
* Node 2: Check for Duplicates: It searches for existing bills with the invoice number "INV-12345" and finds none.
* Node 3: Match Purchase Order: It searches for open purchase orders for "Global Office Inc." around the invoice date and finds a matching, unbilled PO for $350.75.

404

* "Receipt" Pathways are executed:
1. Log Expense Pathway: This sequence runs at the same time.
* Node 1: Match Bank Transaction: The system searches Pat's connected bank and credit card feeds for a transaction of $350.75 around the invoice date but finds no such payment.

406

* Evidence Synthesis and Ranking: The system now gathers all the "evidence" it has collected.
* Evidence from "Create Bill" Pathway:
* `vendor_found`: True
* `is_duplicate_bill`: False
* `matching_po_found`: True
* `po_number`: "PO-678"

408

* Evidence from "Log Expense" Pathway:
* `bank_transaction_match`: False

410

* Historical Context: The system analyzes the visual characteristics of the invoice and searches Pat's history for similar-looking documents. It finds that the last 5 documents that looked just like this one were all recorded as "Bills" from "Global Office Inc." This adds a powerful piece of evidence: `historical_match_confidence: 0.98 to the evidence structure for Create Bill`

* Ranking: A personalized model, specifically tuned for Pat, weighs all this evidence. The `matching_po_found` and the very high `historical_match_confidence` are given significant weight, while the `bank_transaction_match: False` from the receipt pathway acts as negative evidence for that option.

412

* User-Facing Presentation: Pat sees the following on the screen:
* Top Recommendation: "Create a new Bill for $350.75 due July 15, 2025, from Global Office Inc.?"
* *Supporting Evidence Shown:* "This matches open Purchase Order PO-678 and is how you've handled similar invoices from this vendor before."
* Alternative Option: "Log an expense of $350.75."

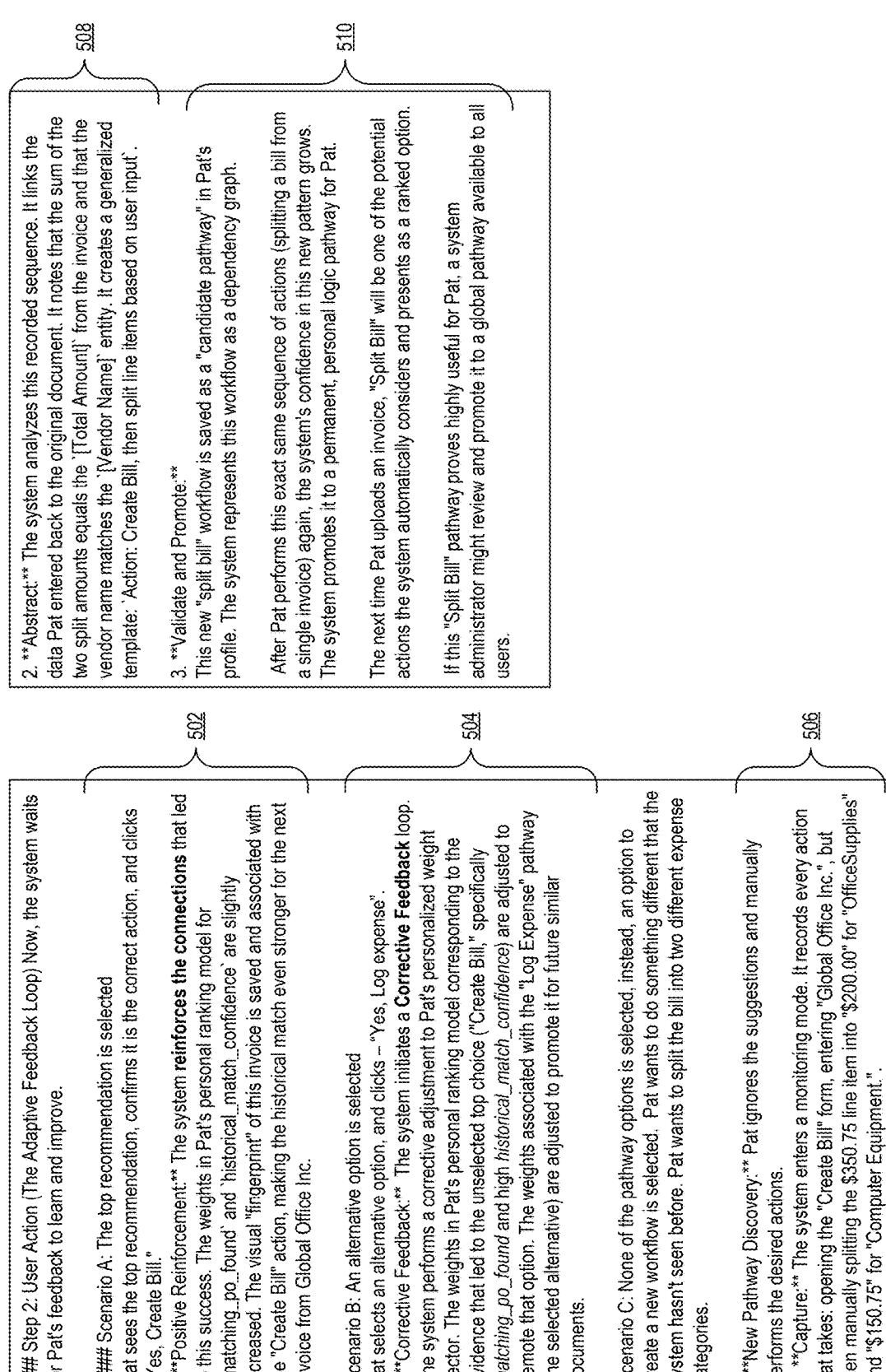

*508*

2. Abstract: The system analyzes this recorded sequence. It links the data Pat entered back to the original document. It notes that the sum of the two split amounts equals the `[Total Amount]` from the invoice and that the vendor name matches the `[Vendor Name]` entity. It creates a generalized template:` Action: Create Bill, then split line items based on user input`.

3. Validate and Promote:
This new "split bill" workflow is saved as a "candidate pathway" in Pat's profile. The system represents this workflow as a dependency graph.

After Pat performs this exact same sequence of actions (splitting a bill from a single invoice) again, the system's confidence in this new pattern grows. The system promotes it to a permanent, personal logic pathway for Pat.

The next time Pat uploads an invoice, "Split Bill" will be one of the potential actions the system automatically considers and presents as a ranked option.

If this "Split Bill" pathway proves highly useful for Pat, a system administrator might review and promote it to a global pathway available to all users.

*510*

Step 2: User Action (The Adaptive Feedback Loop) Now, the system waits for Pat's feedback to learn and improve.

Scenario A: The top recommendation is selected
Pat sees the top recommendation, confirms it is the correct action, and clicks "Yes, Create Bill."

* Positive Reinforcement: The system reinforces the connections that led to this success. The weights in Pat's personal ranking model for `matching_po_found` and `historical_match_confidence` are slightly increased. The visual "fingerprint" of this invoice is saved and associated with the "Create Bill" action, making the historical match even stronger for the next invoice from Global Office Inc.

*502*

Scenario B: An alternative option is selected
Pat selects an alternative option, and clicks – "Yes, Log expense".
* Corrective Feedback: The system initiates a Corrective Feedback loop. The system performs a corrective adjustment to Pat's personalized weight vector. The weights in Pat's personal ranking model corresponding to the evidence that led to the unselected top choice ("Create Bill," specifically *matching_po_found* and high *historical_match_confidence*) are adjusted to demote that option. The weights associated with the "Log Expense" pathway (the selected alternative) are adjusted to promote it for future similar documents.

*504*

Scenario C: None of the pathway options is selected, instead, an option to create a new workflow is selected. Pat wants to do something different that the system hasn't seen before. Pat wants to split the bill into two different expense categories.

* New Pathway Discovery. Pat ignores the suggestions and manually performs the desired actions.
1. Capture. The system enters a monitoring mode. It records every action Pat takes: opening the "Create Bill" form, entering "Global Office Inc.", but then manually splitting the $350.75 line item into "$200.00" for "OfficeSupplies" and "$150.75" for "Computer Equipment".

COMBINING COMPUTER IMPLEMENTED GENERALIZED INTELLIGENT DOCUMENT PROCESSING WITH PERSONALIZED PATHWAY SELECTION

BACKGROUND

Intelligent document processing (IDP) systems are software platforms that integrate technologies such as computer vision, natural language processing (NLP), and machine learning to identify document types, extract data fields from documents, and trigger predefined workflows based on the document's content. The results may be presented to users for validation.

IDP systems may rely on predefined classification models to identify the type of document. The predefined models may not capture personalization and evolving workflows. Further, a challenge may arise when users may intend to process uploaded documents in a manner different from a predefined static workflow. IDP systems may require manual correction and lack the capability to generalize from user behavior to discover new processes.

Additionally, IDP systems may lack mechanisms for monitoring user actions to identify repeatable workflows. Another challenge arises in developing a unified architecture that integrates document understanding, intent prediction, adaptive learning, and task mining to identify repeated workflows.

SUMMARY

In general, in one aspect, one or more embodiments relate to a method. The method includes classifying an uploaded document from a user application by a large language model (LLM) to obtain a ranked list of document types of the uploaded document. The method further includes retrieving a multitude of pathways corresponding to the ranked list of document types. The method further includes executing, in parallel, a first portion of each of the multitude of pathways, using an extracted entity of the uploaded document as a parameter, to obtain a multitude of evidence structures. The multitude of evidence structures corresponds to the multitude of pathways. The method further includes processing the multitude of evidence structures using a personalized ranking model of a user of the user application, to obtain a ranked list of pathways. The method further includes presenting, in the user application, the ranked list of pathways. The method further includes receiving, from the user application, a selected pathway of the ranked list of pathways. The method further includes executing a second portion of the selected pathway to process the uploaded document.

In general, in one aspect, one or more embodiments relate to a system. The system includes at least one computer processor, and a large language model (LLM), executing on the at least one computer processor. The system further includes a personalized ranking model, executing on the at least one computer processor. The system further includes a document processing engine, executing on the at least one computer processor and interfacing with the LLM and the personalized ranking model. The document processing engine performs operations including classifying an uploaded document from a user application by the LLM to obtain a ranked list of document types of the uploaded document. The operations further include retrieving a multitude of pathways corresponding to the ranked list of document types. The operations further include executing a first portion of each of the multitude of pathways, using an extracted entity of the uploaded document as a parameter, to obtain a multitude of evidence structures. The multitude of evidence structures corresponds to the multitude of pathways. The operations further include processing the multitude of evidence structures using the personalized ranking model of a user of the user application, to obtain a ranked list of pathways. The operations further include presenting, in the user application, the ranked list of pathways. The operations further include receiving, from the user application, a selected pathway of the ranked list of pathways, and executing a second portion of the selected pathway.

In general, in one aspect, one or more embodiments relate to a method. The method includes classifying an uploaded document from a user application by a large language model (LLM) to obtain a ranked list of document types of the uploaded document. The method further includes retrieving, by a document processing engine, a multitude of pathways, each including an executable object, corresponding to the ranked list of document types. The method further includes executing, in parallel, by the document processing engine, a first portion of each of the multitude of pathways, using extracted entities of the uploaded document as parameters, to obtain a corresponding multitude of evidence structures. The method further includes processing the corresponding multitude of evidence structures using a personalized ranking model corresponding to a user of the user application, to obtain a ranked list of pathways. The method further includes transmitting, by the document processing engine, the ranked list of pathways to the user application. The method further includes receiving, from the user application, a selected pathway of the ranked list of pathways. The method further includes executing, by the document processing engine, a second portion of the selected pathway. Responsive to the selected pathway being a primary recommended pathway, a personalized vector of the personalized ranking model is updated to increase weights of evidence features of the personalized vector. An evidence structure corresponding to the selected pathway includes the evidence features. A historical match confidence score of the evidence structure is updated. Responsive to the selected pathway being an alternative option, a personalized vector of the personalized ranking model is updated to increase first weights of first evidence features of the personalized vector. A first evidence structure corresponding to the selected pathway includes the first evidence features. The personalized vector of the personalized ranking model is further updated to decrease second weights of second evidence features of the personalized vector. A second evidence structure corresponding to the primary recommended pathway includes the second evidence features.

Other aspects of one or more embodiments will be apparent from the following description and the appended claims.

BRIEF DESCRIPTION OF DRAWINGS

FIGS. 4 and 5 show examples, in accordance with one or more embodiments.

Like elements in the various figures are denoted by like reference numerals for consistency.

DETAILED DESCRIPTION

One or more embodiments are directed to a hybrid system that combines computer implemented generalized intelligent document processing system with personalized pathway selection. The hybrid system processes an uploaded document through a multi-stage pipeline. A first portion of the multistage pipeline performs generalized processing that is the same across multiple users. A second portion applies personalized ranking and selection that is specific to the user. By having a hybrid approach, the first portion saves computer resource usage while having more accurate document understanding while the second portion provides for user-intent-specific processing of documents.

The multistage pipeline includes the following stages. In a first triage and classification stage, a large language model (LLM) performs multi-class classification and structured data extraction. In a second parallel pathway execution stage, logic pathways corresponding to the classified document types are instantiated and partially executed in parallel. The partial execution of a pathway produces evidence objects, which are intermediate results of execution. In a third evidence synthesis and ranking stage, the evidence objects are synthesized into respective evidence structures associated with the pathways. A personalized ranking model of a particular user evaluates the evidence structures to rank the logic pathways. In a fourth stage of user-facing presentation, the ranked list of logic pathways is presented to the user as options to process the uploaded document. Thus, a second portion of the selected pathway is processed.

The adaptive feedback loop continually tunes the system based on user interaction. If the user confirms the top recommendation of the ranked list of pathways, the system reinforces the evidence that led to the correct choice. If the user selects an alternative or performs a novel action, the system adjusts its ranking model accordingly. In cases where the user performs a previously unseen workflow, the system captures the sequence of actions, abstracts it into a reusable candidate pathway, and promotes it to a permanent logic pathway upon repeated observation. In other words, the system enables a "done-for-you" experience for the user, minimizing user effort and maximizing automation accuracy.

Figure 1:
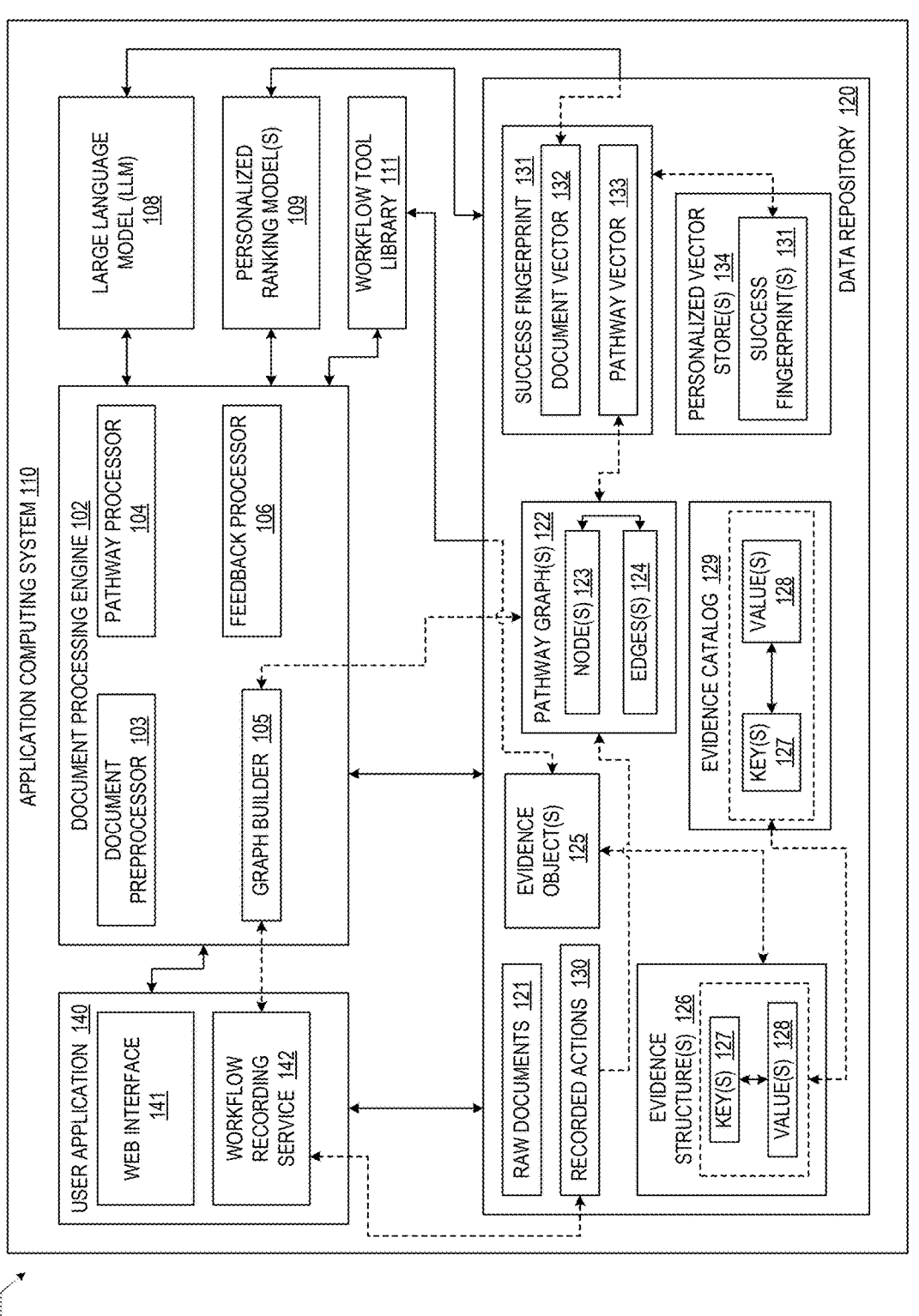
FIG. 1 shows a computing system, in accordance with one or more embodiments.

Attention is now turned to the figures. FIG. 1 shows a computing system, in accordance with one or more embodiments. The system shown in FIG. 1 may include a server computing system (100). The application computing system (110) is one or more computer processors, data repositories, communication devices, and supporting hardware and software. The application computing system (110) may be in a distributed computing environment. The application computing system (110) includes a computer processor. The computer processor is one or more hardware or virtual processors which may execute computer readable program code that defines one or more applications, such as the document processing engine (102), the LLM (108), the personalized ranking model(s) (109), the workflow tool(s) referenced by the workflow tool library (111), and the user application (140). An example of the computer processor is described with respect to the computer processor(s) (602) of FIG. 6A. Thus, the server computing system (100) is configured to execute one or more applications, such as the document processing engine (102), the LLM (108), the personalized ranking model(s) (109), the workflow tool(s)

(111), and the user application (140). An example of a computer system and network that may form the application computing system (110) is described with respect to FIG. 6A and FIG. 6B.

The system shown in FIG. 1 includes a data repository (120). The data repository (120) is a type of storage unit or device (e.g., a file system, database, data structure, or any other storage mechanism) for storing data. The data repository (120) may include multiple different, potentially heterogeneous, storage units and/or devices.

The data repository (120) further includes raw document(s) (121). The raw document(s) (121) are uploaded document images or files prior to processing. The raw documents (121) serve as the source for entity extraction and classification during the document triage and classification stage.

The data repository (120) further includes one or more pathway graph(s) (122). A pathway graph (122) is a computational graph representing a pathway of execution, implementing business logic of the application computing system (110). A one to one mapping may exist between pathway graphs and pathways of execution such that each pathway has a corresponding pathway graph. The pathway graph (122) includes node(s) (123) and edge(s) (124). Node(s) (123) correspond to executable units of code configured to perform specific functions such as database retrieval, vector similarity search, API invocation, data transformation, etc. The node(s) (123) are referenced within pathway graph(s) (122) and invoked during instantiation or execution of a pathway. The edge(s) (124) encode execution order and dependency relationships between node(s) (123). Edge(s) (124) may represent conditional branching or default sequencing within the computational graph. Thus, the pathway graph(s) (122) act as reusable templates from which executable objects may be instantiated. The executable objects are referred to, in the current specification, as pathways.

As a general overview, a computational graph is a structured representation of a sequence of operations that are performed to achieve a defined outcome. Unlike a simple data graph, for example, a data model of entities and their relationships, a computational graph encodes executable business logic of a software application. A node in a computational graph corresponds to a discrete executable unit of code that performs a specific function, such as querying a database, invoking an API, or executing a vector similarity search, etc. The edges in the computational graph represent execution dependencies, which may be conditional or default, and define the order in which nodes are invoked during execution.

When a computational graph is instantiated, parameter placeholders in the graph may be bound to actual data values, for example, extracted from an uploaded document or contextual data. This instantiation transforms the (abstract) computational graph into an executable object. The executable object is a runtime representation that is ready for execution on a computer processor. In a similar manner, instantiation of the pathway graph, which is generic and parameterized, renders the executable object, or the pathway, which includes the specific context of the data sources and/or user.

In one or more embodiments, a node of a pathway, upon execution, may produce an evidence object. The evidence objects produced by nodes of a pathway may be aggregated into an evidence structure, corresponding to the whole pathway. Notably, in the parallel pathway execution stage, pathways may be partially executed. In other words, respective first portions of the pathways may be executed, to obtain corresponding evidence structures. Once a pathway is selected for further execution, a second portion of the selected pathway may be executed to obtain the intended business outcome. Examples of business outcomes may include creating a bill, logging an expense, or setting a renewal reminder. Execution traceability may be maintained through evidence structures and success fingerprints for adaptive feedback mechanisms and new pathway discoveries.

The data repository (120) further includes evidence object(s) (125). Evidence object(s) (125) are outputs generated by node(s) (123) during execution of a pathway instantiated from a pathway graph (122). Namely, an evidence object is an object that is generated through execution that may be indicative of or used as evidence as to the correct pathway to select. Evidence object(s) (125) may capture intermediate results such as vendor match status, similarity scores, database records from database calls, function parameter values from API calls, etc.

The data repository (120) further includes evidence structure(s) (126). An evidence structure (126) is a representation of intermediate results obtained when a pathway is partially executed. A node (e.g., a single node) of a pathway being executed may produce an evidence object, which is the output of the executable unit of code of the node. Thus, evidence structure(s) (126) are aggregations of evidence object(s) (125) into normalized key-value pairs for ranking. Further, there exists a one-to-one mapping between an evidence structure (126) and a pathway. Evidence structure(s) (126) may be processed by personalized ranking models (109), to rank pathways for processing the uploaded document. An evidence structure (126) further includes key(s) (127) and value(s) (128). Key(s) (127) define evidence feature names, and value(s) (128) store corresponding feature data. A key-value pair thus represents an evidence feature. Together, key(s) (127) and value(s) (128) form the atomic elements of evidence structure(s) (126). A system-wide schema of allowable evidence features, that is, evidence keys and associated metadata is maintained in the evidence catalog (129). The evidence catalog (129) expands dynamically when new pathways introduce new evidence features. The new evidence features are added to the evidence catalog (129).

The data repository (120) further includes recorded actions (130). Recorded actions (130) capture raw user interactions when the selected pathway is the creation of a new workflow. In one or more embodiments, the user application (140) may be configured to log user interface events performed by a user, e.g., selection of a menu item for invoking a database call, entering values in a form, etc. Recorded actions (130) may include UI events, timestamps, and entered values. In one or more embodiments, the recorded actions (130) may be converted into pathway graphs (122).

The data repository (120) further includes success fingerprint(s) (131). The success fingerprint (131) is a structured representation of a successful processing run of an uploaded document by the document processing engine. A success fingerprint (131) includes a vector representation of an uploaded document and the selected pathway used to process the uploaded document. Specifically, a success fingerprint (131) includes a document vector (132) and pathway vector (133), which are stored in a personalized vector store (134) for historical context retrieval. The document vector (132) encodes visual and semantic features of the uploaded document. In one or more embodiments, the document vector (132) is a hidden-state vector of the uploaded document, obtained from the LLM (108). A hidden-state vector of an uploaded document obtained from the LLM refers to the internal representation generated by the LLM during the LLM's encoding process. Specifically, when the LLM processes a document image, the visual and textual content is transformed into a high-dimensional vector that captures the semantic and structural features of the document. The hidden-state vector is the final hidden-state output from the encoder portion of the LLM. Thus, the hidden-state vector serves as a compact, machine-readable summary of the uploaded document's content and layout. The pathway vector (133) encodes the structure and semantics of the selected pathway. More particularly, the pathway vector (133) may encode the structure and semantics of the pathway graph of the selected pathway. The pathway graph may be encoded into a pathway vector (133). The pathway vector (133) is a high-dimensional representation that captures the structure, semantics, and operational dependencies of the pathway graph. The encoding process to generate the pathway vector (133) may involve one or more graph embedding techniques, such as a graph neural network (GNN) or a transformer-based model that treats the graph as a sequence of operations with contextual dependencies. Thus, the success fingerprints (131) support similarity search of document vectors for the evidence synthesis and ranking stage. The success fingerprints (131) may further support similarity search of pathway vectors for isomorphism checks when generating a new pathway graph.

In one or more embodiments, evidence structures corresponding to the parallel, partial execution of one or more pathways instantiated to process a particular uploaded document may be obtained. The document processing engine may then search the personalized vector store corresponding to a particular user for document vectors that match a vector of the currently uploaded document. A success fingerprint including a document vector that matches a vector of the uploaded document may be found. The corresponding pathway vector of the success fingerprint may match one of the partially executed pathways instantiated to process the currently uploaded document. The implication of the match is that in at least one previous instance, a similar document was successfully processed using the particular pathway. In this case, the evidence structure of the matching partially executed pathway may be augmented with a historical match confidence score. The historical match confidence score serves to promote the particular pathway up the rankings when the personalized ranking model processes the particular evidence structure.

The application computing system (110) further includes a document processing engine (102). The document processing engine (102) is software or application specific hardware which, when executed by the computer processor, controls and coordinates operation of the software or application specific hardware described herein. The document processing engine (102) performs the method of FIG. 2. The document processing engine (102) orchestrates the end-to-end processing of uploaded documents, coordinating classification, pathway instantiation, evidence synthesis, ranking, and feedback capture. The document processing engine (102) interacts with the data repository (120) to retrieve pathway graph(s) and evidence schema and invokes downstream components to generate executable objects for workflow execution.

The document processing engine (102) further includes a document preprocessor (103). The document preprocessor (103) may normalize uploaded files, perform optical character recognition, and applies optional security and redaction filters. The document preprocessor (103) prepares the raw document content for analysis by the LLM (108) and subsequent entity extraction.

The document processing engine (102) further includes a pathway processor (104). The pathway processor (104) retrieves pathway graph(s) from the data repository (120) and instantiates executable objects by binding extracted entities obtained from the currently uploaded document by the LLM (108) to parameter placeholders. The pathway processor (104) may execute, in parallel, respective first portions of the instantiated pathways to generate evidence structures for ranking. The pathway processor (104) may further continue execution of a second (remaining) portion of a selected pathway. Upon successful completion of execution of the selected pathway, the pathway processor (104) may generate a success fingerprint of vectors of the currently uploaded document and the selected pathway. In generating a pathway vector for the selected pathway, in one or more embodiments, the pathway vector may encode identifiers of the selected pathway, and identifiers of the constituent nodes of the selected pathway.

The document processing engine (102) further includes a graph builder (105). The graph builder (105) constructs computational graphs representing candidate workflows discovered from recorded user actions. The graph builder (105) abstracts raw action logs into a pathway graph template, by replacing instance-specific values of the raw actions with semantic placeholders and organizing steps into dependency graphs. In one or more embodiments, the user may perform the same workflow again. When the graph builder generates the pathway graph for the repeated workflow, the graph builder may perform a graph similarity check. The graph builder (105) may check whether a similar pathway graph was recently generated or may be found from the pathway graphs (122), having the same nodes and edges. In one or more embodiments, if the pathway graph generated from recorded actions is similar to an existing pathway graph, the existing pathway graph may be promoted within the personalized vector of the personalized ranking model. The promotion ensures that the personalized ranking model assigns higher weight to evidence features associated with the particular existing pathway graph. Thus, the particular existing pathway graph may be more likely to appear as a top-ranked recommendation the next time a similar document is processed.

The application computing system (110) further includes a feedback processor (106). The feedback processor (106) updates personalized ranking model(s) (109) based on user selections. Positive reinforcement increases weights for evidence supporting correct recommendations, while corrective updates apply modulated adjustments when alternatives are chosen.

The application computing system (110) further includes an LLM (108). The LLM (108) corresponds to the standard definition used in the art. The LLM may be a vision based large language model. The LLM in machine learning refers to a model that significantly exceeds standard machine learning models in terms of scale, complexity, and capacity. Specifically, the LLM is defined by having millions or more parameters (e.g., can be in the hundreds of millions to billions of parameters), which cause the LLM to learn and represent highly complex patterns in data. An LLM therefore uses substantial computational resources for training and inference and are often trained on massive datasets. A vision based LLM combines natural language understanding with vision perception. The LLM (108) performs multi-class classification of uploaded documents and extracts structured entities with semantic types. The LLM (108) generates top-k candidate document types and associated confidence scores, which guide pathway selection and instantiation.

The application computing system (110) further includes one or more personalized ranking model(s) (109). A one-to-one mapping exists between a personalized ranking model (109) and a user of the user application (140). Personalized ranking model(s) (109) compute scores for instantiated pathways using evidence structures, historical context, and initial classification confidence. The personalized ranking model(s) (109) apply user-specific weight vectors to evidence structures using a scoring function. Further, the user-specific weight vectors may expand dynamically when new evidence features are introduced, affecting continuous personalization and adaptation. The user-specific weight vectors are referred to as personalized vectors.

The personalized vector acts as the personalization layer of the ranking model. The personalized vector is a set of numerical weights that determine an amount of influence each evidence feature has when scoring candidate pathways for a currently uploaded document by a particular user. The scoring function of the personalized ranking model flattens the evidence structure to obtain evidence features of the evidence structure. The scoring function then applies the personalized vector in an element-wise manner to the evidence features. The personalized vector may be created initially with neutral values (e.g., zeros or global averages) when the user first interacts with the system. Over time, as the user provides feedback, by selecting the top recommendation, choosing an alternative, or indicating a new workflow the weights of the personalized vector may be updated. Positive reinforcement may increase weights for evidence features that supported correct predictions, while corrective feedback reduces weights for evidence features that supported erroneous predictions. The updates to the weights may be modulated by factors like evidence confidence, selection rank, and initial classification confidence.

The personalized vector may be dynamically expanded when new evidence features appear, such as when a newly created pathway graph introduces new keys into the evidence catalog. Instead of retraining the personalized ranking model, new weights may be added to the personalized vector and initialized with neutral values. Thus, architectural changes or full retraining of the personalized ranking model may be obviated, by incremental updates to the personalized vector.

An example architecture for the personalized ranking model is a linear scoring function combined with embeddings for context. For instance, the inputs may be the flattened evidence feature vector, the document embedding, the pathway embedding, and an embedding of the user context. For scoring, a similarity between concatenated document and pathway embeddings and the user embedding may be computed, (e.g., dot product). Further, a weighted sum over evidence features using the personalized vector may be applied. The scores may be combined (e.g., linear combination or small feed-forward layer) to produce the final ranking score.

The application computing system (110) further includes a workflow tool library (111). The workflow tool library (111) catalogs workflow tools. A workflow tool is an executable unit referenced by nodes in pathway graph(s). The workflow tool implements a specific function type, such as database retrieval, API invocation, or vector similarity search. The workflow tools may be invoked via the nodes of the pathway during pathway execution to perform discrete workflow steps.

The application computing system (110) further includes a user application (140). In one or more embodiments, the user application (140) may be a web-based client application, operating within a web browser. Other embodiments of the user application (140) may include native desktop applications, mobile applications, remote desktop clients, etc.

The user application (140) further includes a web interface (141). The web interface (141) may present ranked pathway recommendations to the user, including the primary recommended pathway and alternative options with supporting evidence. In one or more embodiments, the primary recommended pathway may be the top-ranked pathway of the ranked list of pathways. The alternative options may be the remaining pathways of the ranked list of pathways, excluding the top-ranked pathway. The supporting evidence may be in the form of natural language summaries/narratives derived from the evidence structures. The web interface (141) may capture user selections or new workflow indications.

The user application (140) further includes a workflow recording service (142). The workflow recording service (142) logs user actions when the option to create a new workflow is selected. Recorded actions may include UI control identifiers, field labels, entered values, and timestamps. The recorded actions may form the basis for pathway abstraction and pathway graph generation by the graph builder (105).

While FIG. 1 shows a configuration of components, other configurations may be used without departing from the scope of one or more embodiments. For example, various components may be combined to create a single component. As another example, the functionality performed by a single component may be performed by two or more components.

Figure 2:
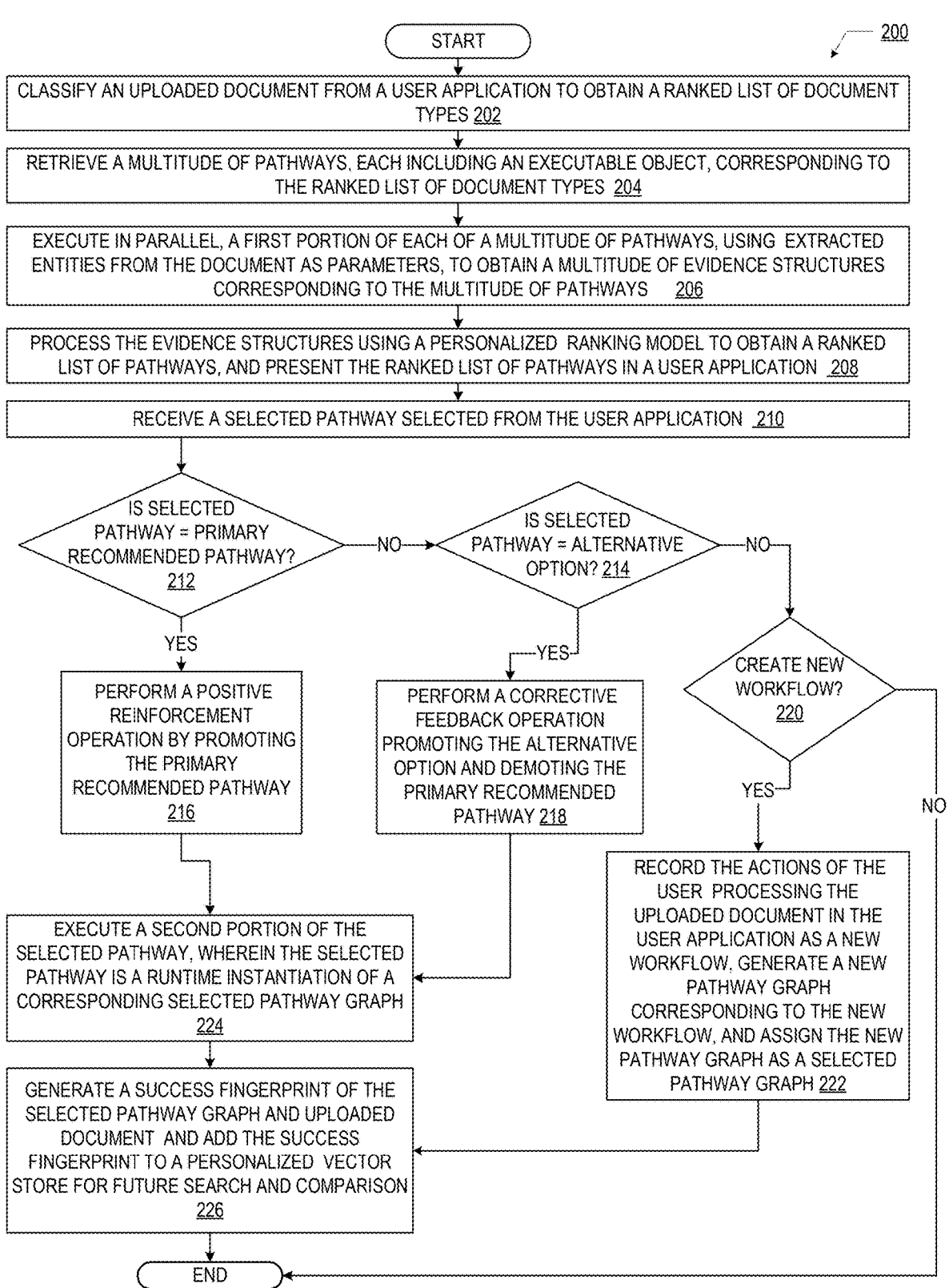
FIG. 2 shows a flowchart of a method, in accordance with one or more embodiments.

FIG. 2 shows a flowchart 200 of a method for combining computer implemented generalized intelligent document processing with personalized pathway selection in accordance with one or more embodiments. The method of FIG. 2 may be implemented using the system of FIG. 1 and one or more of the steps may be performed on or received at one or more computer processors. While the various steps in flowchart 200 are presented and described sequentially, at least some of the steps may be executed in different orders, may be combined or omitted, and at least some of the steps may be executed in parallel. Furthermore, the steps may be performed actively or passively.

In Block 202, an uploaded document from a user application is classified to obtain a ranked list of document types. In one or more embodiments, the document preprocessor of the document processing engine may receive the document from the user application. The document is classified, and entities are extracted from the document to obtain a ranked list of document types. In one or more embodiments, an LLM may classify the uploaded document to obtain a ranked list of document types of the uploaded document, and a current document vector corresponding to the uploaded document is obtained from the LLM as a hidden-state vector. In one or more embodiments, the document preprocessor may perform one or more methods of entity extraction from the document, such as invoice number, customer name and address, etc. Further, the preprocessed uploaded document may be provided to the LLM. The LLM may classify the document to return a top-k ranked list of document types, based on the input provided to the LLM. Further, the LLM may return confidence scores corresponding to the document types. For example, the LLM may classify an uploaded document as "Vendor_invoice, 92%, Receipt_filed, 72%, inventory_items, 20%."

In Block 204, a multitude of pathways may be retrieved. Each pathway may include an executable object. The multitude of pathways may correspond to the ranked list of document types. In one or more embodiments, a multitude of pathways corresponding to the ranked list of document types may be retrieved by the pathway processor.

In Block 206, first portions of a multitude of pathways are executed in parallel, using extracted entities from the uploaded document as parameters. Parallel execution of the first portions includes starting execution of two or more of the pathways concurrently at a time. Thus, a first portion of a first pathway and a first portion of a second pathway are concurrently executed. In one or more embodiments, each of the multiple pathways are executed in parallel. A multitude of evidence structures corresponding to the multitude of pathways may be obtained. The evidence structures may include intermediate results of the execution of the respective first portions. In one or more embodiments, the executable object may include a multitude of nodes interconnected by a multitude of edges. Each node of the multitude of nodes may reference, or include, a workflow tool configured to perform a specific function. In one or more embodiments, the executable object may be a runtime instantiation of a pathway graph. The pathway graph may be a computational graph. Further, the first portion may be executed using extracted entities of the uploaded document as parameters. When a node of a pathway is executed, the result of the execution may be an evidence object. The evidence objects of the nodes of a pathway may be aggregated into an evidence structure corresponding to the pathway. A multitude of evidence structures corresponding to the multitude of pathways may be obtained in this manner.

In Block 208, the evidence structures are processed using a personalized ranking model to obtain a ranked list of pathways. Further, the ranked list of pathways is presented in the user application. In one or more embodiments, the personalized ranking model may correspond to a user of the user application. In other words, a one-to-one mapping may exist between a user and a personalized ranking model. In one or more embodiments, a personalized vector of the personalized ranking model may be applied to the evidence structures. The personalized vector may include a multitude of weights corresponding to evidence features. In applying the personalized vector to the evidence structures, the corresponding document type confidence scores may be used as a weighting factor, to obtain a corresponding multitude of ranking scores of the multitude of pathways. Further, the multitude of pathways may be reordered in accordance with the corresponding multitude of ranking scores to obtain the ranked list of pathways.

In one or more embodiments, an evidence structure may include a historical match confidence score as an evidence feature. The historical match confidence score may be obtained when a historical context retrieval is performed to augment the evidence structures with similarity-based features. In one or more embodiments, prior to ranking the evidence structures, a search may be performed using the current document vector in a personalized vector store. The personalized vector store may include a multitude of success fingerprints. A success fingerprint may further include a previous document vector of a previously uploaded document. A success fingerprint may further include a corresponding previous pathway vector of a previous pathway graph, which was instantiated as a previous pathway. Further, the previous pathway may have been executed to process the previously uploaded document. In one or more embodiments, a similarity function may be applied to the previous document vector and the current document vector to obtain a similarity score. Further, responsive to the similarity score satisfying a similarity threshold, the historic confidence match score may be added to an evidence structure. The particular evidence structure may correspond to a partially executed pathway that was partially executed on the uploaded document. The partially executed pathway may further match the previous pathway.

Accordingly, the ranked list of pathways may be presented in the user application. In one or more embodiments, the multitude of pathways may be reordered in accordance with the ranked list of evidence structures to obtain the ranked list of pathways. Further, a top-ranked pathway of the ranked list of pathways may be assigned as a primary recommended pathway. The top-ranked pathway may be presented as the primary recommended pathway in the user application. The remaining pathways of the ranked list of pathways, excluding the top-ranked pathway, may be presented as alternative options. Further, an additional option may be presented to the user, as an alternative to the ranked list of pathways. The option may be for the user to perform a different set of operations to process the uploaded document. The user application may be configured to record the manual interactions and feature selections carried out by the user to process the uploaded document, and from these recorded actions, a new workflow may be created.

In Block 210, a selected pathway of the ranked list of pathways is received from the user application. In one or more embodiments, the selected pathway may be the user's choice among the primary recommended pathway and the alternative options. In other embodiments, an additional option may be presented.

In Block 212, a check is carried out to ascertain if the selected pathway is the primary recommended pathway. If the selected pathway is the primary recommended pathway, control passes to Block 216. In Block 216, a positive reinforcement operation is performed by promoting the primary recommended pathway. Specifically, the primary recommended pathway is promoted in the personalized vector of the personalized ranking model. That is, weights of the evidence features in the evidence structure corresponding to the selected pathway (e.g., the primary recommended pathway) may be increased in the personalized vector. The magnitude of the increase may be proportional to the confidence score of the evidence features. Further, the magnitude of the increase may be inversely proportional to the rank of the user-selected option. The weighting or scaling factor may be the confidence score of the document type, obtained when performing the steps of Block 202.

Accordingly, in Block 216, in one or more embodiments, responsive to the selected pathway being the primary recommended pathway, a personalized vector of the personalized ranking model may be updated. More specifically, weights of evidence features of the personalized vector may be increased. The particular evidence features may be included in the evidence structure corresponding to the selected pathway. Further, the historical match confidence score of the evidence structure may be increased. Control then passes to Block 224.

In Block 212, if the selected pathway is not the primary recommended pathway, control passes to Block 214.

In Block 214, a check is carried out to ascertain if the selected pathway is an alternative option. If the selected pathway is an alternative option, control passed to Block 218. In Block 218, a corrective feedback operation is performed promoting the alternative option and demoting the highest ranked option. In one or more embodiments, the corrective feedback operation may entail updating the personalized vector of the personalized ranking model to increase first weights of first evidence features of the personalized vector. A first evidence structure corresponding to the selected pathway may include the first evidence features. The corrective feedback operation may further entail updating the personalized vector of the personalized ranking model to decrease second weights of second evidence features of the personalized vector. A second evidence structure corresponding to primary recommended pathway may include the second evidence features. Control then passes to Block 224. If the selected pathway is not an alternative option, control passes to Block 220.

In Block 220, a check is carried out to ascertain whether the user has selected an option to create a new workflow. If the option to create a new workflow is selected, control passes to Block 222. If the option to create a new workflow is not selected, control passes to the end of the flowchart 200 and the method ends.

In Block 222, the actions of the user processing the uploaded document are recorded in the user application as a new workflow. A new pathway graph corresponding to the new workflow is generated. The new pathway graph is assigned as a selected pathway graph. Control then passes to Block 226. In one or more embodiments, the user application may record a set of actions performed by the user to process the uploaded document, via the workflow recording service. Further, the graph builder of the document processing engine may receive the set of actions from the user application. The graph builder may further generate a new pathway graph based on the set of actions. The new pathway graph may be a computational graph. Furthermore, the document processing engine may add a new pathway vector of the new pathway graph, and a document vector of the uploaded document to a new success fingerprint corresponding to the uploaded document. The new success fingerprint may be added to the personalized vector store corresponding to the user.

In Block 224, a second portion of the selected pathway is executed to complete processing of the uploaded document. The selected pathway is a runtime instantiation of a corresponding selected pathway graph. In one or more embodiments, executing the second portion performs the remaining operations of the executable object associated with the selected pathway.

In Block 226, a success fingerprint of the selected pathway graph and uploaded document is generated. Further, the success fingerprint is added to the personalized vector store for future search and comparison. In one or more embodiments, a new pathway vector encoding the new pathway graph and a document vector encoding the uploaded document are added to a new success fingerprint corresponding to the uploaded document. The new success fingerprint is added to the personalized vector store.

Figure 3:
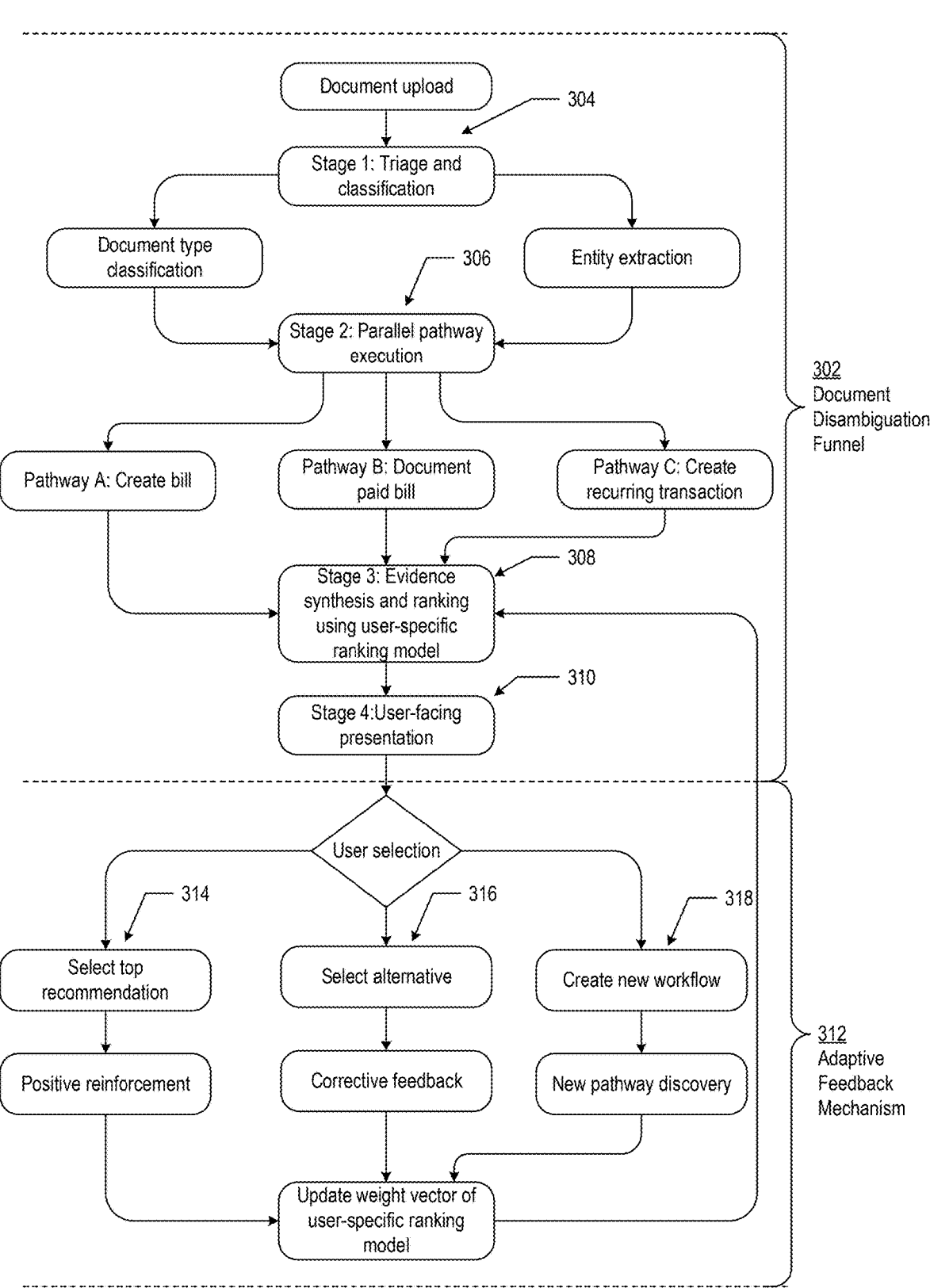
FIG. 3 shows a process flow diagram, in accordance with one or more embodiments.

FIG. 3 is a process flow diagram of an example implementation of processing an uploaded document through the document disambiguation funnel, and adaptive feedback mechanism, in accordance with one or more embodiments. The following example is for explanatory purposes only and not intended to limit the scope of one or more embodiments.

Section 302 of FIG. 3 illustrates the stages of the multiphase system designed to interpret and refine user intent from uploaded documents. The disambiguation funnel operates as a layered pipeline, beginning with raw input and culminating in a ranked list of executable actions. The funnel is designed to be resilient to classification uncertainty and is capable of handling ambiguous or multi-purpose documents.

Block 304 represents the initial intent capture stage. Upon receiving a document, the system employs the LLM to perform a multi-class classification. Rather than assigning a single label, the system generates a ranked list of the top-k most probable document types, each associated with a confidence score. For example, a document may be classified as both an "Invoice" (95% confidence) and a "Receipt" (78% confidence). Simultaneously, the system extracts structured data entities (e.g., vendor name, invoice number, due date, and total amount) and associates the extracted structured data entity with the semantic type of the extracted structured data entity.

Block 306 depicts the stage of through parallel pathway execution. For the top-k classified document types, the system triggers corresponding pathways to execute in parallel. The pathways are executable objects structured as directed acyclic graphs (DAGs). The node represents a corresponding functional operation, such as database_query, api_call, or data_transformation. Each executed pathway processes the extracted entities and outputs standardized evidence objects. For instance, an "Invoice" pathway may include nodes to find a matching vendor, check for duplicate bills, and locate related purchase orders. A "Receipt" pathway may search for matching bank transactions. Pathways are executed in parallel so that both top-ranked and lower-ranked classifications are considered.

Further, the system evaluates the uploaded document in light of historical user behavior and contextual metadata. It retrieves prior successful interactions by performing a nearest-neighbor search against a personalized vector database of document fingerprints. This historical context is added to the evidence structure as a distinct feature, such as historical_match_confidence, which quantifies similarity to previously processed documents.

Block 308 represents a third stage of intent disambiguation, namely, evidence synthesis and ranking. The system aggregates the evidence objects of the executed pathways into corresponding evidence structures. The evidence structures include both pathway-specific evidence and historical context. A personalized ranking model then applies a personalized vector to the evidence structures, scoring and ranking the pathways. The top-ranked pathway is presented to the user as the primary recommendation, along with supporting evidence. Alternative options are also displayed, allowing the user to confirm, reject, or select an alternative.

Section 312 of FIG. 3 depicts the adaptive feedback mechanism, which enables continuous learning and personalization based on user interactions. The adaptive feedback mechanism ensures that the system evolves over time to better align with individual user workflows and preferences.

In section 312, after presenting the ranked actions, the system monitors the user's selection. If the user confirms the top recommendation as shown in Block 314, this is treated as positive reinforcement. If the user selects an alternative, as shown in Block 316, the system performs corrective feedback. If the user creates a new workflow, as shown in Block 318, the system performs the operations leading to new pathway discovery/establishment.

The positive reinforcement and corrective feedback entails evaluating the evidence structure of the selected pathway, considering the following factors: the confidence score of the evidence, the rank of the selected option, and the initial classification confidence. Based on the factors, the system updates the user-specific weight vector used in the ranking model, promoting the selected pathway's evidence features, if the selected pathway is the top recommendation. This adjustment improves the accuracy of future predictions for that user. If the selected pathway is an alternate option, the system performs dual operations of promoting evidence features of the selected pathway and demoting evidence features of the top recommendation. This nuanced analysis allows the system to penalize strong evidence for incorrect hypotheses more heavily and to learn more from low-confidence classifications. Additionally, the system stores the document fingerprint and the selected action in the user's vector database to enhance historical context retrieval.

In the new pathway discovery, the user may perform a novel sequence of actions not covered by existing pathways, and the system enters a monitoring mode. The system logs the user's actions, extracts semantic metadata, and generalizes the sequence into a candidate pathway using heuristics such as string similarity, semantic alignment, and temporal proximity. This candidate pathway is abstracted into a reusable template and represented as a candidate pathway graph. If the candidate pathway graph displays isomorphism to a previous pathway graph retrieved from success fingerprints, it is promoted to a permanent logic pathway for that user. High-utility pathways may be reviewed and promoted to the global set, making them available to users.

Together, Sections 302 and 312 of FIG. 3 form a synergistic architecture that combines interpretable logic with adaptive learning. The system disambiguates user intent with high precision. Further, the system evolves dynamically by learning from user behavior, thereby enabling a "done-for-you" experience with minimal user input.

FIGS. 4 and 5 show an example of a user experience of uploading a document, in the deployed system of FIG. 1. The following example is for explanatory purposes only and not intended to limit the scope of one or more embodiments.

The example shown in FIGS. 4 and 5 illustrate the experience of a user, Pat, a small business owner, receives an invoice from Global Office Inc. for a recent order. Rather than paying it immediately, Pat follows a standard workflow: the invoice is first recorded as a "Bill" in the accounting software to be paid later. To begin this process, Pat scans the invoice and uploads the image to the system, as shown in Section 402 of FIG. 4. In section 402, the first stage of intent disambiguation is the triage/classification stage. In this stage, the vision-based large language model (V-LLM) analyzes the uploaded image and performs a multi-class classification. It identifies the document as highly likely to be an invoice with 95% confidence, but also notes that it has features of a receipt with 78% confidence. The system extracts structured data from the document, including the vendor name ("Global Office Inc."), invoice number ("INV-12345"), due date ("Jul. 15, 2025"), and total amount ("$350.75").

The second stage is parallel pathway execution. Because the system has identified two plausible document types—Invoice and Receipt—it initiates logic pathways for both types simultaneously. In section 404 of FIG. 4, the "Invoice" pathway is executed. For the "Invoice" classification, the system executes the "Create Bill" pathway. This pathway includes a sequence of automated checks: first, the system queries the database for "Global Office Inc." and finds a matching vendor record. Next, it checks for duplicate bills using the invoice number and confirms that none exist. Finally, it searches for open purchase orders around the invoice date and finds a matching, unbilled "PO" for "$350.75."

In parallel, as shown in section 406 of FIG. 4, the "Receipt" classification triggers the "Log Expense" pathway. This pathway attempts to match the invoice amount with recent bank or credit card transactions. However, the system finds no such transaction for $350.75 around the invoice date.

The third stage is evidence synthesis and ranking. As shown in section 408, the system aggregates the outputs of both pathways into structured evidence. From the "Create Bill" pathway, the evidence includes vendor found: True, is_duplicate_bill: False, matching_po_found: True, and po_number: "PO-678." From the "Log Expense" pathway, the evidence includes bank_transaction_match: False. Additionally, the system performs historical context retrieval, shown in section 410 of FIG. 4. The system analyzes the visual characteristics of the invoice and compares them to Pat's history of processed documents. The system finds that the last five similar-looking documents were recorded as "Bills" from Global Office Inc., resulting in a historical_match_confidence score of 0.98.

In section 412 of FIG. 4, a personalized ranking model, tuned specifically for Pat, weighs the evidence. The presence of a matching purchase order and the high historical match confidence are given significant weight, while the lack of a bank transaction match acts as negative evidence against the receipt pathway. Based on this, the system presents Pat with the top recommendation: "Create a new Bill for $350.75 due Jul. 15, 2025, from Global Office Inc.?" along with supporting evidence. An alternative option, "Log an expense of $350.75," is also presented. The user, Pat sees the user-facing presentation, depicted in section 414 of FIG. 4.

Turning to FIG. 5, the system now awaits Pat's feedback to refine its understanding and improve future predictions. If Pat confirms the top recommendation and clicks "Yes, Create Bill," the system reinforces the connections that led to this success. This scenario is shown as "Scenario A" in section 502 of FIG. 5. The weights in Pat's personal ranking model for matching_po_found and historical_match_confidence are slightly increased. The visual fingerprint of the invoice is saved and associated with the "Create Bill" action, strengthening future historical context retrieval.

If Pat instead selects the alternative option, as shown in Scenario B of section 504 of FIG. 5, and clicks "Yes, Log expense," the system initiates a corrective feedback loop. The system adjusts Pat's personalized weight vector to demote the previously top-ranked option ("Create Bill") and promote the selected alternative ("Log Expense"). The weights associated with the evidence features that led to the unselected (top-ranked) recommendation are reduced, while those supporting the chosen pathway are increased.

In a third scenario, Pat decides to perform a new action not previously seen by the system—splitting the bill into two expense categories. As shown in section 506 of FIG. 5, Pat manually opens the "Create Bill" form, enters "Global Office Inc.," and splits the $350.75 line item into $200.00 for "Office Supplies" and $150.75 for "Computer Equipment." The system enters monitoring mode and records Pat's actions. In section 508 of FIG. 5, the system then abstracts the actions into a generalized candidate pathway by linking the entered data back to the original document. The system recognizes that the sum of the split amounts equals the total invoice amount, and that the vendor name matches the extracted entity. The system creates a reusable template: "Action: Create Bill, then split line items based on user input."

In section 510 of FIG. 5, the candidate pathway is stored in Pat's profile and represented as a dependency graph. If Pat repeats the same sequence of actions again in future runs, the system's confidence in the pattern increases. The pathway is promoted to a permanent, personal logic pathway. In future uploads, "Split Bill" will be one of the automatically considered and ranked options. If the pathway proves broadly useful, the pathway may be reviewed and promoted to the global set of logic pathways available to users. Further, if the new pathway generates any new types of evidence features, the new evidence feature keys are added to the system's "Evidence catalog." Pat's personalized ranking model's input layer and corresponding weight vector are dynamically expanded to accommodate the new evidence feature keys, with an initial neutral weight, ready to be tuned by subsequent feedback.

In another example implementation, the system shown in FIG. 1 may be deployed to a cybersecurity Security Information and Event Management (SIEM) platform to assist a security analyst. A security alert may be received, containing data such as Internet Protocol (IP) addresses, user credentials, and event type. A set of plausible threat hypotheses (e.g., "ransomware attack," "data exfiltration," "insider threat") may be generated. A multitude of predefined investigation pathways corresponding to each hypothesis may be executed in parallel. Each pathway may include automated actions such as querying threat intelligence feeds, analyzing network traffic logs for anomalous patterns, and checking endpoint detection and response (EDR) logs for specific process executions. The results from execution of a pathway may be synthesized into the respective evidence structure of the pathway. The threat hypotheses may be ranked using a scoring model tuned to the specific network environment or analyst team. The ranked list of potential threats, along with supporting evidence, may be presented to a security analyst. The analyst's final classification of the event may serve as a corrective feedback signal to refine the scoring model. If the analyst performs a novel investigation sequence for an unknown threat, the system may capture the sequence of queries and tool interactions. The system may further generalize the sequence into a new candidate investigation pathway and make the new candidate investigation pathway available for future automated execution.

In yet another example implementation, the system shown in FIG. 1 may be deployed in a clinical decision support system (CDSS) integrated with a hospital's electronic health record (EHR) system. A set of new patient data, such as lab results, reported symptoms, and vital signs may be received. A set of differential diagnoses based on the initial data may be generated. A multitude of diagnostic pathways corresponding to several potential diagnoses may be executed in parallel. The pathway may be a sequence of nodes representing checks for specific clinical signs, orders for confirmatory tests, or execution of medical imaging analysis algorithms. The results from the pathway may be gathered as clinical evidence. The evidence may be augmented with historical context by matching a current patient's data profile against a database of past cases with confirmed diagnoses. The differential diagnoses may be ranked using a scoring model that can be personalized to a specific physician's or department's diagnostic patterns. The ranked list of possible conditions may be presented to the clinician. The clinician's final confirmed diagnosis provides a feedback signal to update the scoring model. When a clinician follows a non-standard but successful diagnostic workflow for a rare condition, the system captures the sequence of tests ordered and data reviewed. The system further formalizes the sequence of tests as a new candidate diagnostic pathway. The system may further dynamically adapt its evidence schema to incorporate any new biomarkers or clinical findings used in the new candidate diagnostic pathway.

The system and method described herein improve accuracy over time for the user in disambiguating the intent of the user, when uploading a particular document. Further, the system autonomously expands the set of predefined workflows. The system dynamically adapts the evidence catalog, or schema, and the personalized ranking models to incorporate new pathways. Thus, the system learns both new processes and how to reason about the process outcomes. The system and method may be applicable across domains, such as accounting, cybersecurity, and clinical decision support, and represents a significant advancement in personalized, self-improving automation systems.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 6A:
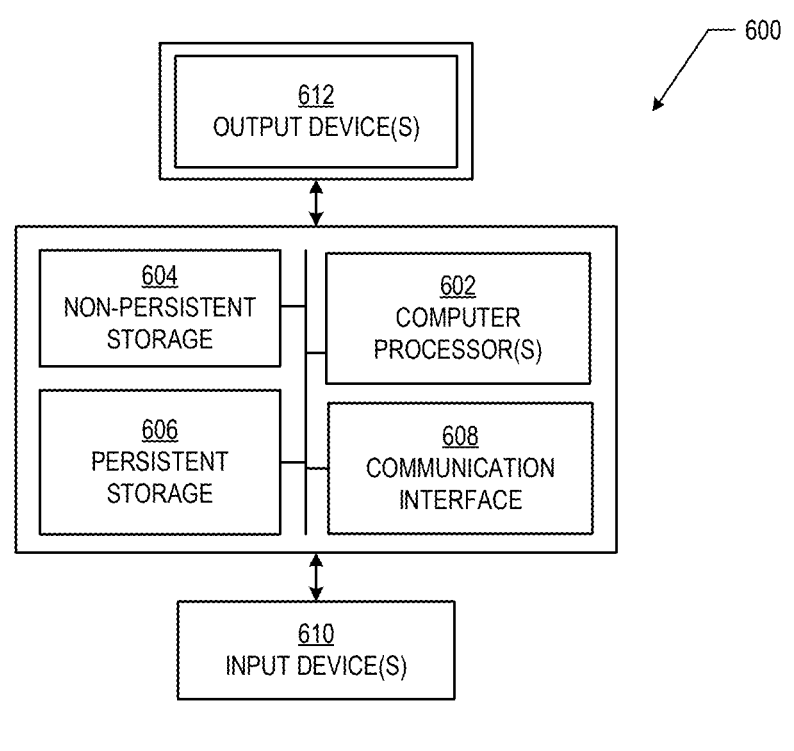
FIGS. 6A and 6B show a computing system, in accordance with one or more embodiments.

For example, as shown in FIG. 6A, the computing system (600) may include one or more computer processor(s) (602), non-persistent storage device(s) (604), persistent storage device(s) (606), a communication interface (608) (e.g., Bluetooth interface, infrared interface, network interface, optical interface, etc.), and numerous other elements and functionalities that implement the features and elements of the disclosure. The computer processor(s) (602) may be an integrated circuit for processing instructions. The computer processor(s) (602) may be one or more cores, or microcores, of a processor. The computer processor(s) (602) includes one or more processors. The computer processor(s) (602) may include a central processing unit (CPU), a graphics processing unit (GPU), a tensor processing unit (TPU), combinations thereof, etc.

The input device(s) (610) may include a touchscreen, keyboard, mouse, microphone, touchpad, electronic pen, or any other type of input device. The input device(s) (610) may receive inputs from a user that are responsive to data and messages presented by the output device(s) (612). The inputs may include text input, audio input, video input, etc., which may be processed and transmitted by the computing system (600) in accordance with one or more embodiments. The communication interface (608) may include an integrated circuit for connecting the computing system (600) to a network (not shown) (e.g., a local area network (LAN), a wide area network (WAN) such as the Internet, mobile network, or any other type of network) or to another device, such as another computing device, and combinations thereof.

Further, the output device(s) (612) may include a display device, a printer, external storage, or any other output device. One or more of the output device(s) (612) may be the same or different from the input device(s) (610). The input device(s) (610) and output device(s) (612) may be locally or remotely connected to the computer processor(s) (602). Many different types of computing systems exist, and the aforementioned input device(s) (610) and output device(s) (612) may take other forms. The output device(s) (612) may display data and messages that are transmitted and received by the computing system (600). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (602), is configured to perform one or more embodiments, which may include transmitting, receiving, presenting, and displaying data and messages described in the other figures of the disclosure.

Figure 6B:
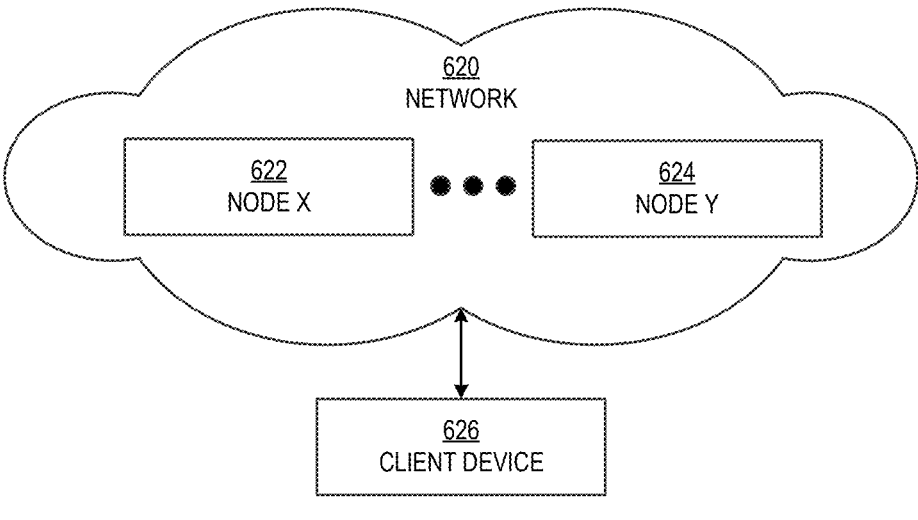

The computing system (600) in FIG. 6A may be connected to, or be a part of, a network. For example, as shown in FIG. 6B, the network (620) may include multiple nodes (e.g., node X (622) and node Y (624), as well as extant intervening nodes between node X (622) and node Y (624)). Each node may correspond to a computing system, such as the computing system shown in FIG. 6A, or a group of nodes combined may correspond to the computing system shown in FIG. 6A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (600) may be located at a remote location and connected to the other elements over a network.

The nodes (e.g., node X (622) and node Y (624)) in the network (620) may be configured to provide services for a client device (626). The services may include receiving requests and transmitting responses to the client device (626). For example, the nodes may be part of a cloud computing system. The client device (626) may be a computing system, such as the computing system shown in FIG. 6A. Further, the client device (626) may include or perform all or a portion of one or more embodiments.

The computing system of FIG. 6A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
classifying an uploaded document from a user application by a large language model (LLM) to obtain a ranked list of document types of the uploaded document;
retrieving a plurality of pathways corresponding to the ranked list of document types;
executing, in parallel, a first portion of each of the plurality of pathways, using an extracted entity of the uploaded document as a parameter, to obtain a plurality of evidence structures, wherein the plurality of evidence structures corresponds to the plurality of pathways;
processing the plurality of evidence structures using a personalized ranking model of a user of the user application, to obtain a ranked list of pathways;
presenting, in the user application, the ranked list of pathways;
receiving, from the user application, a selected pathway of the ranked list of pathways; and
executing a second portion of the selected pathway to process the uploaded document.

2. The method of claim 1, further comprising:
presenting, in the user application, an option to create a new workflow for processing the uploaded document; and
responsive to receiving a selection of the option to create the new workflow,
recording, by the user application, a set of actions performed by the user to process the uploaded document.

3. The method of claim 2, further comprising:
receiving, from the user application, the set of actions;
generating a new pathway graph based on the set of actions;
adding a new pathway vector of the new pathway graph, and a document vector of the uploaded document to a new success fingerprint corresponding to the uploaded document; and
adding the new success fingerprint to a personalized vector store.

4. The method of claim 1, wherein:
the plurality of pathways comprises a pathway comprising an executable object, the executable object comprises a plurality of nodes interconnected by a plurality of edges,
the plurality of nodes comprises a node corresponding to an executable unit of code configured to perform a specific function.

5. The method of claim 4, wherein the executable object is a runtime instantiation of a pathway graph.

6. The method of claim 1, further comprising:
prior to ranking, performing operations comprising:
obtaining, from the LLM, a current document vector corresponding to the uploaded document;
searching, using the current document vector, a personalized vector store comprising a plurality of success fingerprints,
each success fingerprint of the plurality of success fingerprints comprising a previous document vector of a previously uploaded document, and
a previous pathway vector of a previous pathway graph, wherein the previous pathway graph corresponds to a previous pathway that was executed to process the previously uploaded document.

7. The method of claim 6, further comprising:
applying a similarity function to the previous document vector and the current document vector to obtain a similarity score; and
responsive to the similarity score satisfying a similarity threshold,
adding a historic confidence match score to an evidence structure.

8. The method of claim 1, wherein ranking further comprises:
obtaining a corresponding plurality of ranking scores by:
applying a personalized vector of the personalized ranking model, comprising a plurality of weights corresponding to evidence features, to the plurality of evidence structures, and
applying document type confidence scores corresponding to the ranked list of document types as a weighting factor to the corresponding plurality of ranking scores; and
reordering the plurality of pathways in accordance with the corresponding plurality of ranking scores to obtain the ranked list of pathways.

9. The method of claim 1, further comprising:
assigning a top-ranked pathway of the ranked list of pathways as a primary recommended pathway;
presenting the primary recommended pathway in the user application; and
presenting a remaining pathway of the ranked list of pathways as an alternative option.

10. The method of claim 9, further comprising:

responsive to the selected pathway being the primary recommended pathway:

updating a personalized vector of the personalized ranking model to increase a weight of an evidence feature of the personalized vector, and updating a historical match confidence score of the evidence structure comprising the evidence feature.

11. The method of claim 9, further comprising:

responsive to the selected pathway being an alternative option, updating a personalized vector of the personalized ranking model to increase a first weight of first evidence features of the personalized vector, and updating the personalized vector of the personalized ranking model to decrease a second weight of a second evidence feature of the personalized vector.

12. A system, comprising:

at least one computer processor;

a large language model (LLM), executing on the at least one computer processor;

a personalized ranking model, executing on the at least one computer processor; and a document processing engine, executing on the at least one computer processor, and interfacing with the LLM, and the personalized ranking model, wherein the document processing engine performs operations comprising:

classifying an uploaded document from a user application by the LLM to obtain a ranked list of document types of the uploaded document, retrieving a plurality of pathways corresponding to the ranked list of document types, executing a first portion of each of the plurality of pathways, using an extracted entity of the uploaded document as a parameter, to obtain a plurality of evidence structures, wherein the plurality of evidence structures corresponds to the plurality of pathways, processing the plurality of evidence structures using the personalized ranking model of a user of the user application, to obtain a ranked list of pathways, presenting, in the user application, the ranked list of pathways, receiving, from the user application, a selected pathway of the ranked list of pathways, and executing a second portion of the selected pathway.

13. The system of claim 12, further comprising the user application, wherein the user application performs operations comprising:

presenting, in a web interface, an option to create a new workflow for processing the uploaded document, and responsive to receiving a selection of the option to create the new workflow, recording, by a workflow recording service, a set of actions performed by the user to process the uploaded document.

14. The system of claim 13, wherein the document processing engine further performs operations comprising:

receiving, from the user application, the set of actions, generating, by a graph builder of the document processing engine, a new pathway graph based on the set of actions, adding a new pathway vector of the new pathway graph, and a document vector of the uploaded document to a new success fingerprint corresponding to the uploaded document, and adding the new success fingerprint to a personalized vector store.

15. The system of claim 12, wherein the document processing engine further performs operations comprising:

prior to ranking, performing operations comprising:

obtaining, from the LLM, a current document vector corresponding to the uploaded document;

searching, using the current document vector, a personalized vector store comprising a plurality of success fingerprints, each success fingerprint of the plurality of success fingerprints comprising a previous document vector of a previously uploaded document, and a previous pathway vector of a previous pathway graph, wherein the previous pathway graph corresponds to a previous pathway that was executed to process the previously uploaded document.

16. The system of claim 12, wherein the personalized ranking model is further configured for:

obtaining a corresponding plurality of ranking scores by:

applying a personalized vector, comprising a plurality of weights corresponding to evidence features, to the plurality of evidence structures, and applying document type confidence scores corresponding to the ranked list of document types as a weighting factor to the corresponding plurality of ranking scores; and reordering the plurality of pathways in accordance with the corresponding plurality of ranking scores to obtain the ranked list of pathways.

17. The system of claim 12, wherein the document processing engine is further configured for:

assigning a top-ranked pathway of the ranked list of pathways as a primary recommended pathway;

presenting the primary recommended pathway in the user application; and presenting a remaining pathway of the ranked list of pathways as an alternative option in the user application.

18. The system of claim 12, wherein the document processing engine is further configured for:

responsive to the selected pathway being a primary recommended pathway, updating a personalized vector of the personalized ranking model to increase weights of evidence features of the personalized vector, wherein an evidence structure corresponding to the selected pathway comprises the evidence features, and updating a historical match confidence score of the evidence structure, and responsive to the selected pathway being an alternative option, updating a personalized vector of the personalized ranking model to increase first weights of first evidence features of the personalized vector, wherein a first evidence structure corresponding to the selected pathway comprises the first evidence features, and updating the personalized vector of the personalized ranking model to decrease second weights of second evidence features of the personalized vector, wherein a second evidence structure corresponding to the primary recommended pathway comprises the second evidence features.

19. A method, comprising:

classifying an uploaded document from a user application by a large language model (LLM) to obtain a ranked list of document types of the uploaded document;

retrieving, by a document processing engine, a plurality of pathways, each comprising an executable object, corresponding to the ranked list of document types;

executing, in parallel, by the document processing engine, a first portion of each of the plurality of pathways, using extracted entities of the uploaded document as parameters, to obtain a corresponding plurality of evidence structures;

processing the corresponding plurality of evidence structures using a personalized ranking model corresponding to a user of the user application, to obtain a ranked list of pathways;

transmitting, by the document processing engine, the ranked list of pathways to the user application;

receiving, from the user application, a selected pathway of the ranked list of pathways;

executing, by the document processing engine, a second portion of the selected pathway;

responsive to the selected pathway being a primary recommended pathway, updating a personalized vector of the personalized ranking model to increase weights of evidence features of the personalized vector, wherein an evidence structure corresponding to the selected pathway comprises the evidence features, and updating a historical match confidence score of the evidence structure; and responsive to the selected pathway being an alternative option, updating a personalized vector of the personalized ranking model to increase first weights of first evidence features of the personalized vector, wherein a first evidence structure corresponding to the selected pathway comprises the first evidence features, and updating the personalized vector of the personalized ranking model to decrease second weights of second evidence features of the personalized vector, wherein a second evidence structure corresponding to the primary recommended pathway comprises the second evidence features.

20. The method of claim 19, further comprising:

presenting, by the user application, an option to create a new workflow for processing the uploaded document; and responsive to receiving, by the user application, a selection of the option to create the new workflow, recording, by the user application, a set of actions performed by the user to process the uploaded document, receiving, by the document processing engine, from the user application, the set of actions, generating, by the document processing engine, a new pathway graph based on the set of actions, wherein the new pathway graph is a computational graph, adding, by the document processing engine, a new pathway vector of the new pathway graph, and a document vector of the uploaded document to a new success fingerprint corresponding to the uploaded document, and adding the new success fingerprint to a personalized vector store.

* * * * *